(12) United States Patent
Ziakas et al.

(10) Patent No.: US 9,361,257 B2
(45) Date of Patent: Jun. 7, 2016

(54) MECHANISM FOR FACILITATING CUSTOMIZATION OF MULTIPURPOSE INTERCONNECT AGENTS AT COMPUTING DEVICES

(75) Inventors: Dimitrios Ziakas, Portland, OR (US); Zhong-Ning George Cai, Lake Owesgo, OR (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 13/977,678

(22) PCT Filed: Sep. 30, 2011

(86) PCT No.: PCT/US2011/054424
§ 371 (c)(1),
(2), (4) Date: Jun. 29, 2013

(87) PCT Pub. No.: WO2013/048494
PCT Pub. Date: Apr. 4, 2013

(65) Prior Publication Data
US 2013/0297845 A1    Nov. 7, 2013

(51) Int. Cl.
*G06F 13/36* (2006.01)
*G06F 13/14* (2006.01)
*G06F 13/40* (2006.01)
*G06F 13/38* (2006.01)

(52) U.S. Cl.
CPC .......... *G06F 13/4027* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 7,257,655 B1 * | 8/2007 | Burney | G06F 13/423 370/408 |
| 2003/0208611 A1 | 11/2003 | Weber et al. | |
| 2006/0198359 A1 | 9/2006 | Fok et al. | |
| 2008/0209099 A1 | 8/2008 | Kloeppner et al. | |
| 2008/0215823 A1 | 9/2008 | Hosomi | |
| 2009/0132747 A1 * | 5/2009 | Bueti | G06F 13/4059 710/305 |
| 2009/0248928 A1 | 10/2009 | Mandhani et al. | |

FOREIGN PATENT DOCUMENTS

| | | |
|---|---|---|
| CN | 1996321 A | 7/2007 |
| CN | 201526375 U | 7/2010 |
| WO | WO-2006-116026 | 11/2006 |

OTHER PUBLICATIONS

PCT/US2011/054424 Notification of Transmittal of the International Search Report and the Written Opinion of the Internaional Searching Authority, Mailed May 17, 2012, 8 pages.
EP Supplementary European Search Report, from counterpart European Patent Application No. 11873140.5, mailed Mar. 6, 2015, 7 pages.

(Continued)

*Primary Examiner* — David E Martinez
(74) *Attorney, Agent, or Firm* — Blakely, Sokoloff, Taylor & Zafman LLP (57) ABSTRACT

A mechanism is described for facilitating customization of multipurpose interconnect agents at computing devices according to one embodiment of the invention. A method of embodiments of the invention includes enhancing a multipurpose interconnect agent by associating a customization block to the multipurpose interconnect agent at a computing system. Enhancing may include customization of one or more functionalities of the multipurpose interconnect agent. The method may further include customizing, via the customization block, the one or more functionalities of the enhanced multipurpose interconnect agent, wherein customizing includes enabling integration of two or more processor interconnects carrying data packets.

20 Claims, 8 Drawing Sheets

(56) References Cited

OTHER PUBLICATIONS

Implementing PCI Express Bridging Solutions in an FPGA, Lattice Semiconductor Corporation, A Lattice Semiconductor White Paper, Jul. 31, 2010, www.latticesemi.com, XP055174282, 7 pages.

First Office Action of Chinese Application No. 201180074653.9 Mailing Date Dec. 12, 2015, 6 pages.

"Implementing PCI Express Bridging Solutions in an FPGA", Lattice Semiconductor Corporation, A Lattice Semiconductor White Paper, Jul. 31, 2010, www.latticesemi.com, XP055174282, 7 pages.

* cited by examiner

MECHANISM FOR FACILITATING CUSTOMIZATION OF MULTIPURPOSE INTERCONNECT AGENTS AT COMPUTING DEVICES

CROSS-REFERENCE TO RELATED APPLICATIONS

This patent application is a U.S. National Phase Application under 35 U.S.C. §371 of International Application No. PCT/US2011/054424, filed Sep. 30, 2011, entitled MECHANISM FOR FACILITATING CUSTOMIZATION OF MULTIPURPOSE INTERCONNECT AGENTS AT COMPUTING DEVICES.

FIELD

The field relates generally to computing devices and, more particularly, to employing a mechanism for facilitating customization of multipurpose interconnect agents at computing devices.

BACKGROUND

A multipurpose interconnect agent refers to an entity that has functions of a memory agent and an interconnect agent that can help manage interactions to compute subsystems and across combination of such memory and interconnect subsystems. Current interconnection of computing processors and their relevant components, protocols, etc., is managed through software applications or other specialized ASICs. A multipurpose interconnect agent can interact with and manage memory and multiple different interconnects that can be crucial for large system scalability and performance as it helps achieve better resource-sharing, communication efficiency, high bandwidth, low latency, etc., whilst being fully customizable. Today's ASIC designs or software approaches cannot always achieve the full potential of such configurations due to certain limitations, such as due to lack of customization options (e.g., different protocol standards, interconnect network traffic management, performance optimization, etc.) that cannot be dealt with easily on an ASIC design, whilst software would typically lack the performance of a hardware design.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating customization of multipurpose interconnect agents at computing devices according to one embodiment of the invention. A method of embodiments of the invention includes enhancing a multipurpose interconnect agent by associating a customization block to the multipurpose interconnect agent at a computing system. Enhancing may include customization of one or more functionalities of the multipurpose interconnect agent. The method may further include customizing, via the customization block, the one or more functionalities of the enhanced multipurpose interconnect agent, wherein customizing includes enabling integration of two or more processor interconnects carrying data packets.

In one embodiment, embodiments of the present invention provide improves network and interconnect manageability and controllability, protect customers' new and past investments, and add innovative and novel specific solution for customers interconnect network to improve scalability and flexibility, etc.

Figure 1:
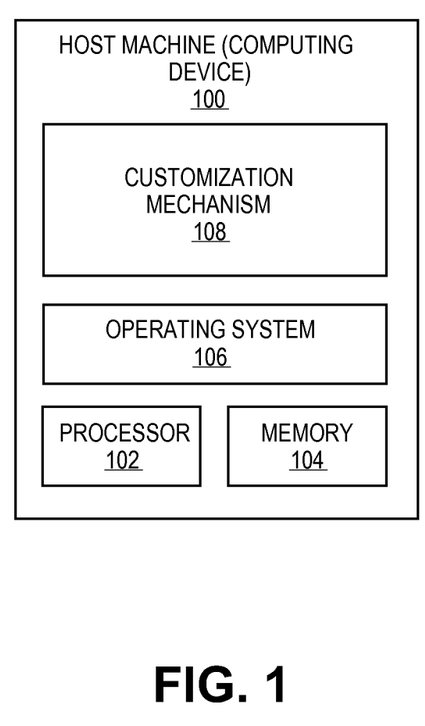
FIG. 1 illustrates a computing device employing customization mechanism for facilitating customization of a multipurpose interconnect agent at computing devices according to one embodiment of the invention.

FIG. 1 illustrates a computing device employing customization mechanism for facilitating customization of a multipurpose interconnect agent at a computing device according to one embodiment of the invention. In one embodiment, a computing device 100 is illustrated as having customization mechanism 108 to provide customization of multipurpose interconnect agent components at computing devices. Computing device 100 may include desktop computers (e.g., personal computers (PCs), etc.), server computers, mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers (e.g., notebooks, netbooks, etc.), e-readers (e.g., Kindle®, Nook®, etc.), set-top boxes (e.g., Internet-based cable television set-top boxes), etc.

In one embodiment, the customization mechanism 108 facilitates customization of various components, features, functionalities, etc., of interconnect agents, such as multipurpose interconnect agents (e.g., Home Agent® by Intel® Corporation), to offer users additional advantages of employing and using such multipurpose interconnect agents. For example, a user may customize certain components or functionalities of a multipurpose interconnect agent by employing it as an intellectual protocol ("IP") cluster or block (e.g., a logic block that can carry all or a subset of multipurpose interconnect agent functionalities, etc.) and that may consist of standardized Application Programming Interfaces (referred to as "API" or simply "interface") and interface signals for better interconnection and use of the IP block's various components. Implementation of this IP cluster or block may allow interfacing to a plurality of interconnects and protocols (e.g., QPI, Peripheral Component Interconnect ("PCI"), PCI-Express ("PCIe"), PCI-Extended ("PCI-X"), Intel QuickPath Interconnect (referred to as "QPI" or "QuickPath"), etc.) resulting in higher processor productivity and increased overall efficiency of the multipurpose interconnect agent and therefore the computing system 100. Further, an IP cluster or block may be programmable through the aforementioned APIs to allow any components it integrates to program it for specific functions of interest or allow users to directly program its features and functions if, for example, a manufacturer or integrator chooses to expose the IP block API directly to a user (e.g., programmer, software developer, system administrator, etc.).

In one embodiment, the customization mechanism 108 may be provided as a customizable IP block associated with or within an existing multipurpose interconnect agent at the computing system. Customization mechanism 108 can help resolve key design hurdles an original equipment manufacturer ("OEM") or an original design manufacture ("ODM") may face in custom designs for development of specialized node controllers ("NCs"), input/output ("I/O") controllers, and other customer solutions (e.g., accelerators, special external memory controllers, etc.). This technique allows the user to use the various components of the customization mechanism 108 in order to aid in designing of NCs as well as for various forms of fabric, accelerator, and other implementations (such as those that can take advantage of QPI to provide the OEM/ODM/customer some specific functions and differentiations in certain areas. Further, the customization mechanism 108 allows for new functionalities to be harnessed through the use of, for example, QPI, etc., by allowing it to act as a cross-interconnect and cross-fabric agent to provide a secured, fast exchange function between two or more interconnect protocols, such as QPI to and from PCIe and between any future interconnects and multiprotocol link interfaces and, for example, PCIe and vice versa, etc. In one embodiment, the customization mechanism 108 serves as a scalable interconnect architecture across multiple multipurpose interconnect agent components, including providing the ability to connect to several different fabrics and not just be limited to Central Processing Unit ("CPU")-to-CPU.

The customization mechanism 108 can help enable OEMs/ODMs to architect and design their NCs and other aforementioned components to be able to offer, for example, associated directory features, fast memory, data transfers, Reliability Availability Serviceability ("RAS"), etc. This way, not only customer investments are protected, but also having the ability to customize and use new features on an multipurpose interconnect agent on the customer side can significantly reduce the typical development and manufacturing time of multipurpose interconnect agents. For example, the customization mechanism 108 can extend the current reach and functionalities of the existing multipurpose interconnect agents and can be used to generate secured domains and priority domains in cluster or cloud configurations. In this case, for example, using the customization mechanism 108, various packets, at the underlying multipurpose interconnect agent, can be processed in accordance with the specified classifications and can then be assigned to specific routes/domains to facilitate generation of secured routes/domains and/or prioritized routes/domains as well as prevention of viral packet propagation. This technique is used to maintain compatibility with different protocol standards with repackaging and/or rearrangement. Further, it can be used to detect whether the transmission (of data, packets, communication, etc.) can be fast forwarded and/or sped-up when no complex re-packaging or re-arrangement is needed for the transmission to occur from one cluster to another cluster via an interconnect work and this customization mechanism 108.

The computing device 100 may employ an multipurpose interconnect agent, as aforementioned, such as Intel's Home Agent, and further include an operating system 106 serving as an interface between any hardware or physical resources of the computer device 100 and a user. Computing device 100 further includes one or more processors 102, memory devices 104, network devices, drivers, or the like, as well as input/output sources, such as touchscreens, touch panels, touch pads, virtual or regular keyboards, virtual or regular mice, etc. It is to be noted that terms like "machine", "device", "computing device", "computer", "computing system", and the like, are used interchangeably and synonymously throughout this document.

Figure 2:
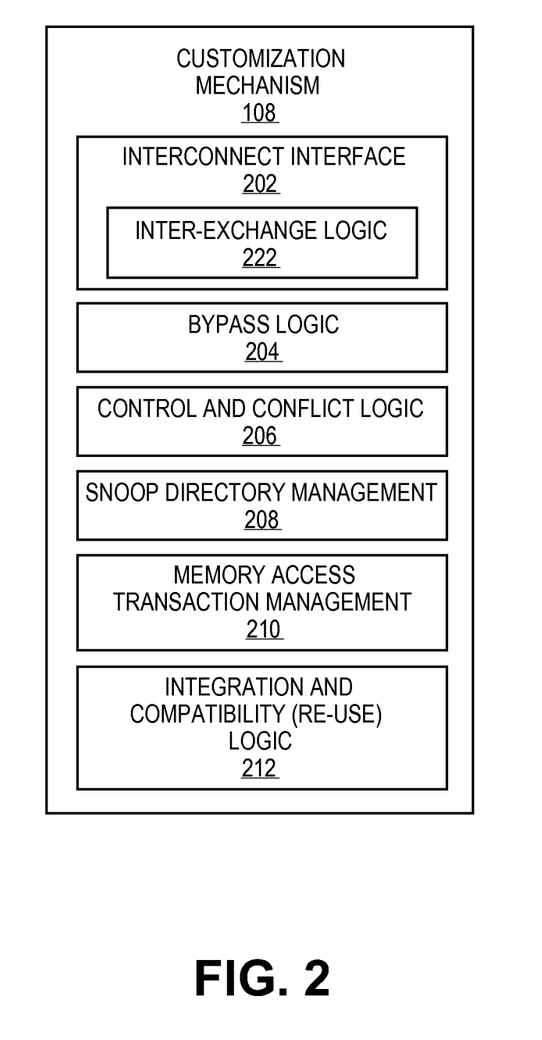
FIG. 2 illustrates customization mechanism employed at a computing device according to one embodiment of the invention.
Figure 3:
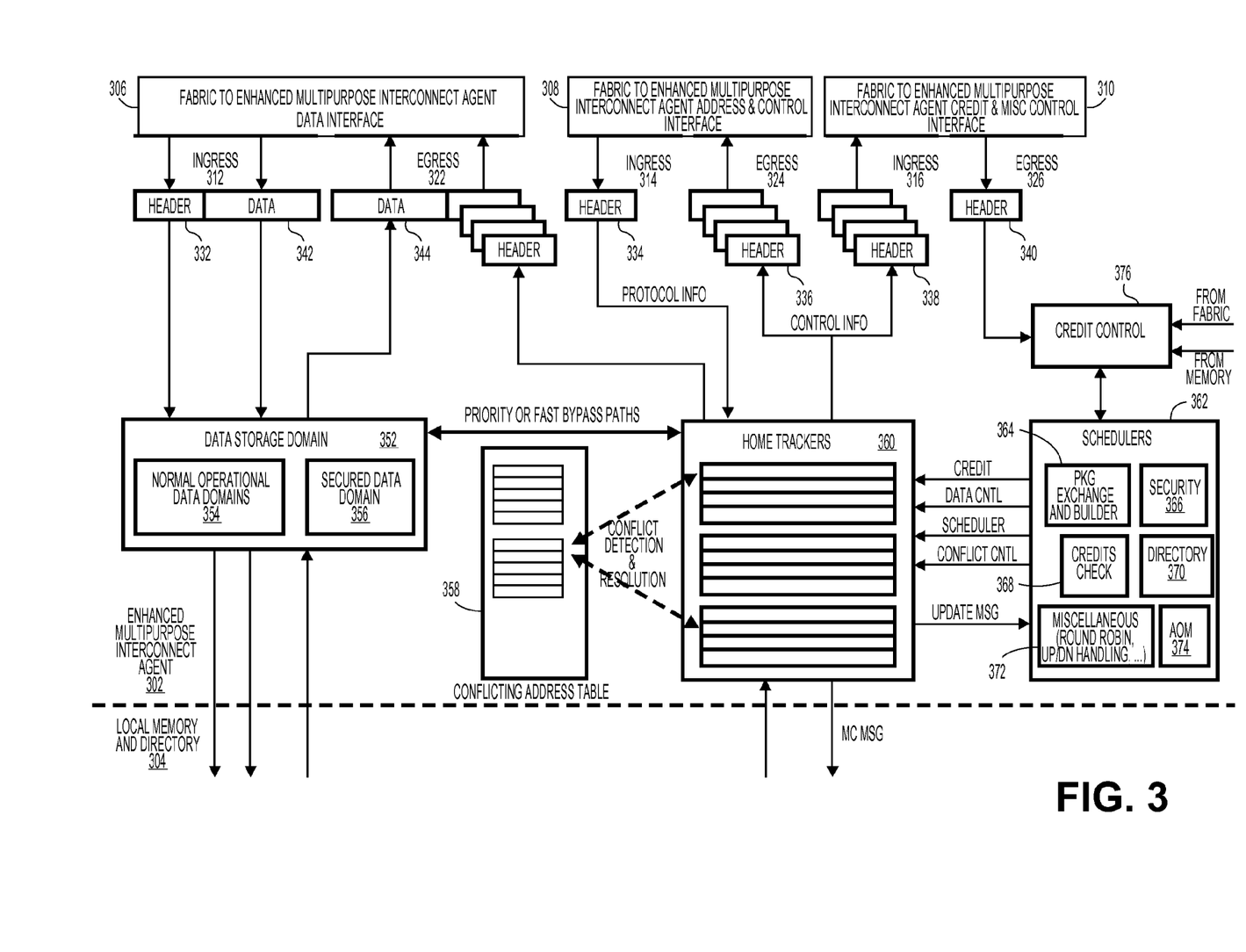
FIG. 3 illustrates an enhanced multipurpose interconnect agent employing customization mechanism according to one embodiment of the invention.

FIG. 2 illustrates a customization mechanism employed at computing device according to one embodiment of the invention. In one embodiment, the customization mechanism 108 includes an interconnect interface 202 which further includes an inter-exchange logic 222. The interconnect interface 202 provides one or more interfaces to interconnect fabric and local storage/memory components, etc. For example, as illustrated in FIG. 3, fabric to data interface, fabric to address and control interface, fabric to credit and miscellaneous control interface, and the like. This interconnect interface 202 can be easily integrated into the aforementioned OEM node controllers, memory controllers, I/O controllers, etc., or act as a cross-interconnect multi-fabric agent.

In one embodiment, the inter-exchange logic 222 facilitates integration of interconnects and support of different protocols. For example, the inter-exchange logic 222 facilitates QPI to PCIe and PCIe to QPI and other aforementioned combinations. Logic 222 provides the ability to integrate and support multiple interconnects and cross-voltage/frequency boundary transactions which lends significant multipurpose interconnect agent implementation flexibility. This functionality can be particularly important to large-scale computing systems and cloud computing. In one embodiment, this interconnect interface 202 having the inter-exchange logic 222 along with other components 204-212 can be added to an existing multipurpose interconnect agent as the customization mechanism 108 to enhance the multipurpose interconnect agent with customizing features of the customization mechanism 108. Further, reception and processing of coherent memory read/write, non-snoop read/write can be supported for QPI to/from PCIe traffic, etc., along with access and control of memory, RSL blocks, registers, standard buffers, and data path are provided.

In one embodiment, bypass logic 204 is provided to accelerate the transmission by processing of certain categories of packages through a fast path by bypassing complex conflict detection and resolution logic, such as a non-coherent data package. The bypass logic 204 can also be used to quickly check package identification ("ID") and security classification (as necessitated), process and re-format the data (e.g., as necessitated to provide multi-protocol support), check the routing table and fast forward to the egress buffer logic to schedule a delivery to the assigned destinations. This functionality provided by the bypass logic 204 can be used to offer value in additional areas, such as relating to processing and QoS for telecommunication or communication and storage equipment, security appliances (or securing server cluster communications across large cluster installations), etc.

The customization mechanism 108 further provides snoop directory management 208 to interface to the snoop directory structure of the multipurpose interconnect agent and manage the snoop directory; for example, allowing the control and conflict logic 206 to notify the directory of remote sockets about the status of cache lines in other computing devices, such as host computing device 100 of FIG. 1. The customization mechanism 108 further includes a memory access transaction management 210 ("transaction management") to check memory addresses and decide which memory channel is going to be the recipient of a pending transaction. The transaction management 210 further provides reads/writes, partial reads/writes, different priority reads/writes, non-snoop reads/writes, and memory channel load balance functions, etc., and may directly manage the high-level transaction control and data flow to and from a memory controller.

The customization mechanism 108 includes an integration and compatibility logic 212 ("reuse logic") to provide, if necessary, reuse of, compatibility with, and/or integration of some of the existing and/or default functionalities and components of a conventional multipurpose interconnect agent that is being enhanced and customized using the customization mechanism 108. This feature further simplifies and the use and employment of customization mechanism 108 without having to incur additional design and manufacturing costs and complications, or the like.

In one embodiment, the customization mechanism 108 includes a control and conflict logic 206 that may be used to facilitate and enable the use of other components 202-204, 208-212 of the customization mechanism 108 as well as provides its own unique functions. For example, the control and conflict logic 206 may facilitate and enable the interconnect interface 202 and its inter-exchange logic 222 to process packages being transmitted between various interconnects, such as QPI, PCIe, etc., as aforementioned. Moreover, the control and conflict logic 206 may hold a large data buffer that is to be used to temporarily store all packages in transit states and can be used to decode (e.g., using an embedded coder/decoder) the package information, check destination address, perform memory mapping and channel arrangement, detect and resolve possible coherent conflicts, and the like. Additional features and/or components of the customization mechanism 108 may further include (1) a cross voltage and frequency domain control, (2) control and interfacing to native Double Data Rate ("DDR") and non-volatile memory ("NVM"), (3) creation and management of hierarchical memory structures within a single computing device, such as computing device 100 of FIG. 1, including, for example, two levels of memory (e.g., with one level being faster in memory access times than the other level), and handling of transaction scheduling and control of the hierarchical memory model, (4) RAS features and error report logic, such as mirroring, lockstep, retry, MCA report, CMCI triggering, etc., and (5) management of a coherent directory of a local region or global coherent transaction performance optimization.

It is contemplated that any number and type of components may be added to and removed from the customization mechanism 108 to facilitate the workings and operability of the customization mechanism 108 for multipurpose interconnect agents at computing devices. For brevity, clarity, ease of understanding and to focus on the customization mechanism 108, many of the default or known components of various devices, such as computing devices, cameras, etc., are not shown or discussed here.

FIG. 3 illustrates an enhanced multipurpose interconnect agent employing customization mechanism according to one embodiment of the invention. In the illustrated embodiment, an enhanced or customized multipurpose interconnect agent 302 employing customization mechanism of FIG. 2 is shown as having an providing various functionalities and components, such as interconnect interfaces fabric to data 306, fabric to address and control 308, and fabric to credit and miscellaneous control 310, etc. An example of an multipurpose interconnect agent may include Intel's Home Agent which can be enhanced or customized by employing the customization mechanism of FIG. 2 as whole or through use of certain relevant components of it. For example, interfaces 306-310 use ingress buffer 312-316 and egress buffer 322-326 to provide an interface to the relevant data 342-344 and headers 332-340 for processing with a data storage domain 352 (including a normal operation data domain 354 and a secured data domain 356), a home tracker 360 in communication with a conflicting address table 358 and schedulers 362 which is further in communication with a credit control 376. The scheduler may include a package exchange and builder 364, a security component 366, a credits check module 368, a snoop directory 370, an Age Ordering Matrix (AOM) 374, and a miscellaneous component 372. AOM allows for scheduling of packets/messages to the egresses 322-326 for dispatch through a configurable number of virtual First-In-First-Outs (FIFOs) and further allows for applying message priority rules to the messages waiting in queues to be dispatched. Further, the enhanced multipurpose interconnect agent 302 is in communication with local memory and directory 304.

As discussed with reference to FIG. 2, the snoop directory management of the customization mechanism may provide an interface and mechanism to snoop the directory 370. Similarly other components of the customization mechanism works to provide the enhanced multipurpose interconnect agent 302 that is customized (or customizable) to perform a number of additional and novel features as referenced in FIG. 2. As further discussed with reference to FIG. 2, the control and conflict logic 206 may play an umbrella role to control, enable, and facilitate various functionalities of the customization mechanism, resulting in the enhanced multipurpose interconnect agent 302.

Figure 4A:
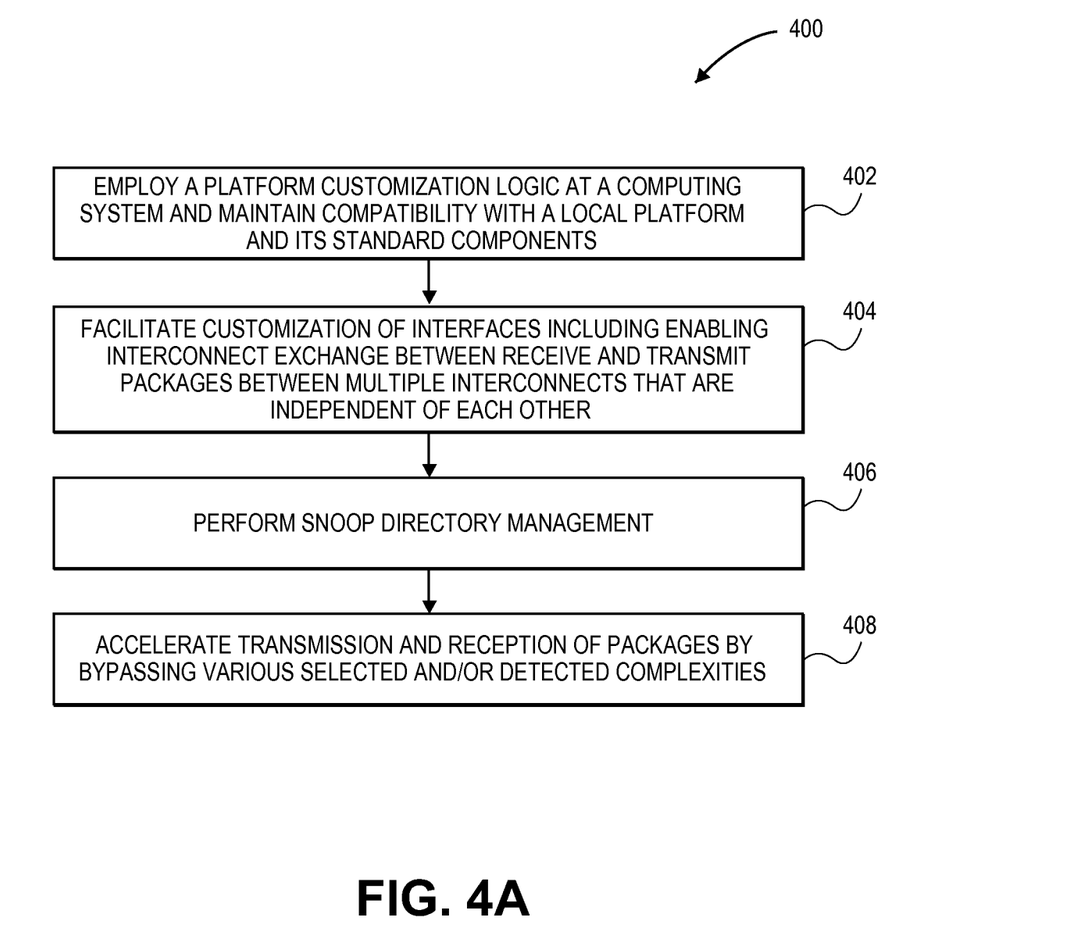
FIG. 4A illustrates a method for employing and facilitating customization mechanism at a computing device according to one embodiment of the invention.

FIG. 4A illustrates a method for employing and facilitating using customization mechanism at a computing device according to one embodiment of the invention. Method 400 may be performed by processing logic that may comprise hardware (e.g., circuitry, dedicated logic, programmable logic, etc.), software (such as instructions run on a processing device), or a combination thereof. In one embodiment, method 400 may be performed by customization mechanism 108 of FIG. 1.

Method 400 begins with employing of a customization mechanism at a computing system, while maintaining compatibility with a local multipurpose interconnect agent and its standard components at block 402. At block 404, in one embodiment, the employed and available customization mechanism is used to facilitate customization of various functionalities of the multipurpose interconnect agent, such as enabling interconnect exchange between receiving and transmitting of packages between multiple interconnects that are independent of each other. At block 406, for example, snoop directory management is performed. At block 408, for example, transmission and reception of the packages is accelerated by bypassing various selected and/or detected complexities associated with the transmission and/or reception processes.

Figure 4B:
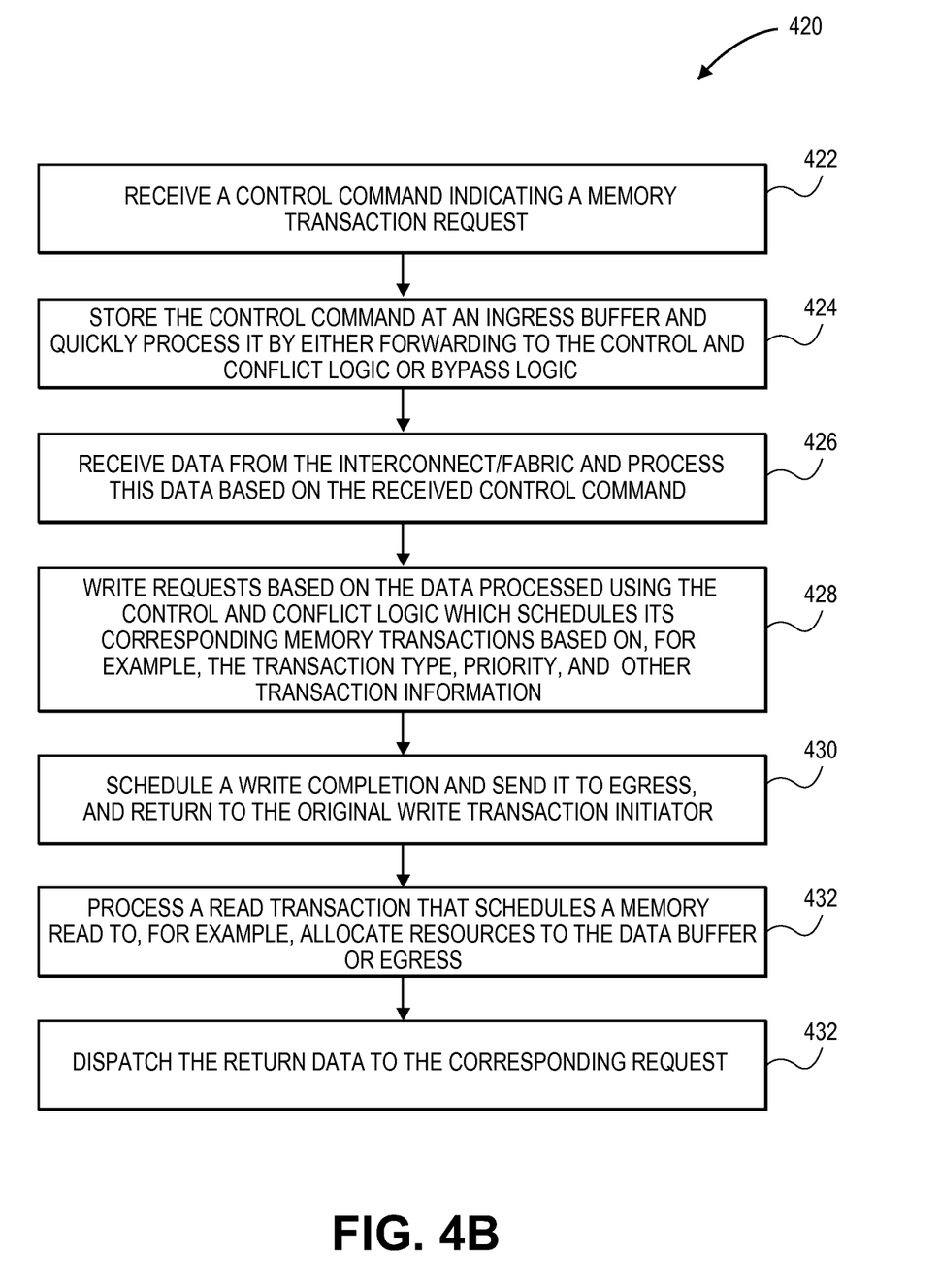
FIG. 4B illustrates a method for control and data flows using customization mechanism at a computing device according to one embodiment of the invention.

FIG. 4B illustrates a method for control and data flows using customization mechanism at a computing device according to one embodiment of the invention. Method 420 may be performed by processing logic that may comprise hardware (e.g., circuitry, dedicated logic, programmable logic, etc.), software (such as instructions run on a processing device), or a combination thereof. In one embodiment, method 420 may be performed by customization mechanism 108 of FIG. 1.

Method 420 begins with block 422 a control command indicating a memory transaction request is received at the customization mechanism. At block 424, the control command is stored at an ingress buffer and is quickly processed by forwarding the control command to either the control and conflict logic or the bypass logic of the customization mechanism. At block 426, data is received through an interconnect/fabric interface of the customization mechanism and is then processed based on the received control command. If the command is not received, the data based on a transaction ID or other index method is stored in a data buffer for further processing. At block 428, a request is written based on the data processed using the control and conflict logic which schedules its corresponding memory transactions based on, for example, the transaction type, priority, and other relevant transaction information. When, for example, the memory channel buffer is available, this write may be quickly processed and the relevant data sent to the designated memory channel and its controller for writing data to memory (e.g., Dynamic Random Access Memory ("DRAM"), non-volatile memory, etc.) or another fabric.

At block 430, a write completion is scheduled and sent to an egress buffer and then returned to an original write transaction initiator. At block 432, a read transaction that schedules a memory read to, for example, allocate resources to a data buffer or an egress buffer is processed by the control and conflict logic of the customization mechanism. The read may be scheduled and implemented based on various architecture requirements, such as conflict detection, conflict resolution, memory channel arrangement, read request sending to the memory channel, and subsequent receipt of the return data with error checking from memory. Further, the read is scheduled to allocate the resource to the data buffer or the egress buffer. At block 432, the return data is dispatched to the corresponding request.

Figure 4C:
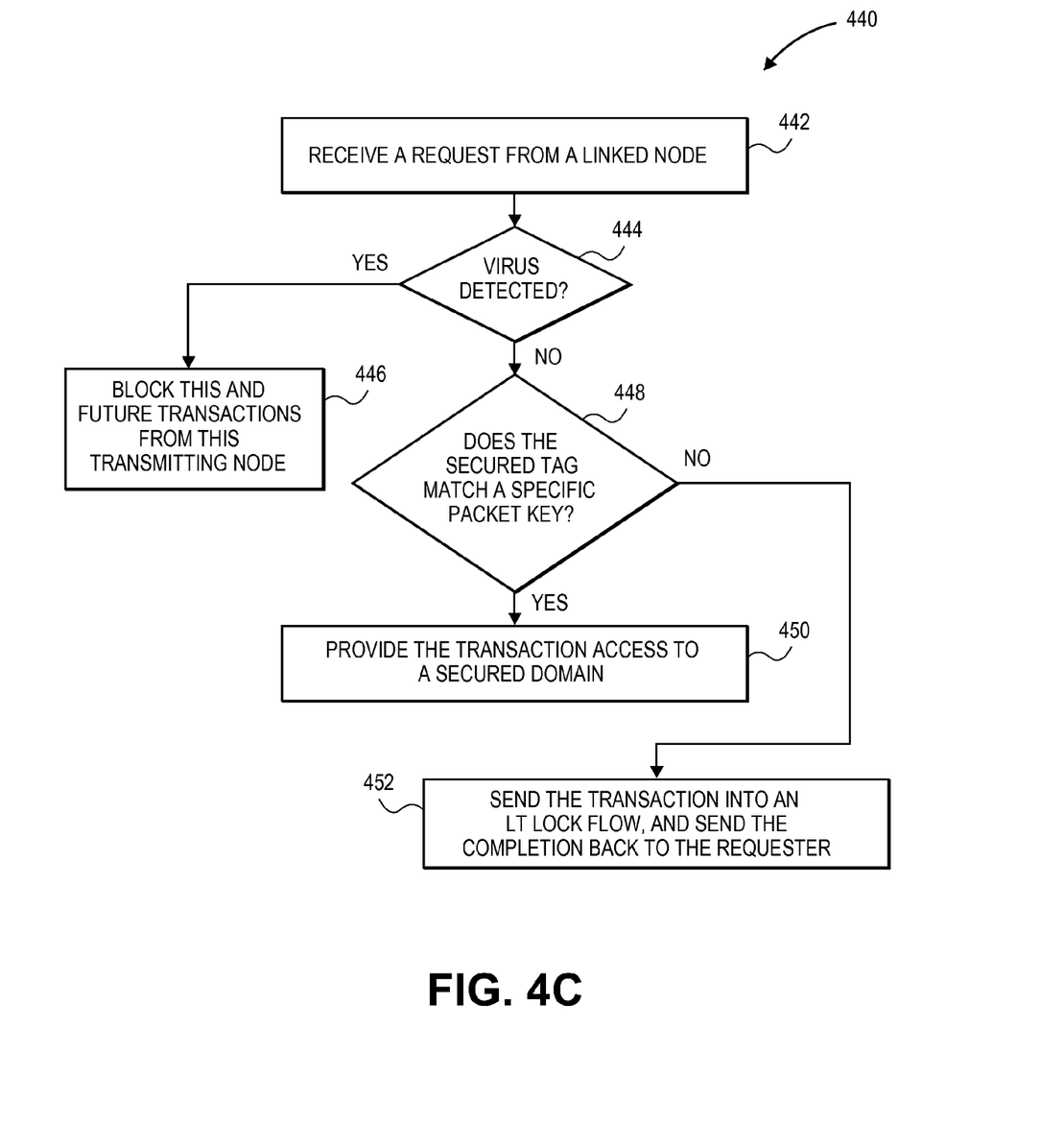
FIG. 4C illustrates a method for a security flow using customization mechanism at a computing device according to one embodiment of the invention.

FIG. 4C illustrates a method for a security flow using customization mechanism at a computing device according to one embodiment of the invention. Method 440 may be performed by processing logic that may comprise hardware (e.g., circuitry, dedicated logic, programmable logic, etc.), software (such as instructions run on a processing device), or a combination thereof. In one embodiment, method 440 may be performed by the customization mechanism of FIG. 1.

Method 440 begins with receiving, at the customization mechanism, a request for a linked node at block 442. At block 444, a determination is made as to whether a virus is detected in the request. If a virus is detected, at block 446, this request and other future request or transactions from this particular node are blocked to avoid any potential virus-related problems. The infected node may be responded with an LT lock flow, 1's may be returned to read requests, while write requests are dropped with completion. Further, for diagnosis purposes, the customization mechanism may selectively record the type of requests, frequency, and other relevant information in one or more security registers. At block 448, if the virus is not detected, the process with another determination as to whether a secured tag or ID or node ID match with a specific packet key. At block 452, if the tag or ID does not match the key and/or is not verified, then the request transaction goes into an LT lock flow, and the read returns 1's as an error (e.g., PCIe error, etc.), while the write is dropped from the flow and a completion is sent back to the requester. At block 450, if the tag or ID does match the key, and the transaction meets other additional access criteria as specified in configuration registers, it can access the secured domain.

Figure 4D:
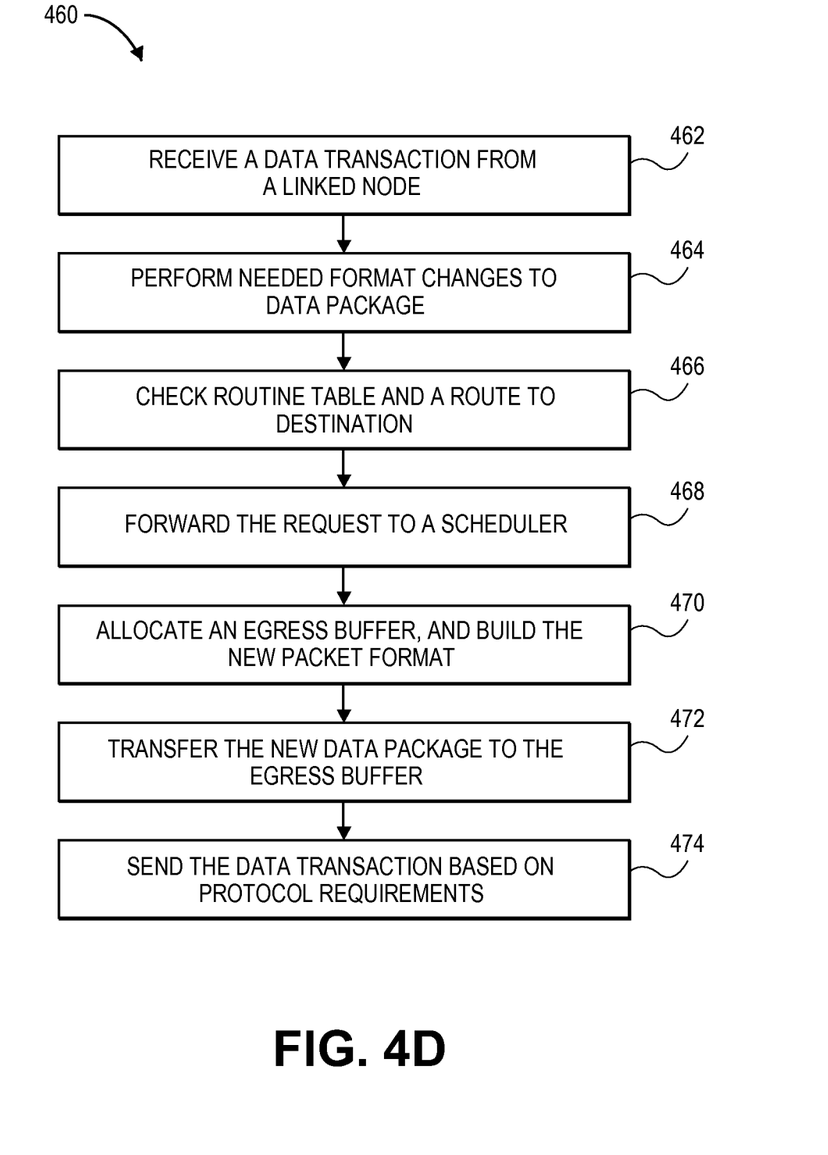
FIG. 4D illustrates a method for a fast forward data flow using customization mechanism at a computing device according to one embodiment of the invention.

FIG. 4D illustrates a method for a fast forward data flow using customization mechanism at a computing device according to one embodiment of the invention. Method 460 may be performed by processing logic that may comprise hardware (e.g., circuitry, dedicated logic, programmable logic, etc.), software (such as instructions run on a processing device), or a combination thereof. In one embodiment, method 460 may be performed by the customization mechanism of FIG. 1.

Method 460 begins with block 462 with the customization mechanism receiving a data transaction request from a linked node. At block 464, the control and conflict logic of the customization mechanism recommends and performs format changes to the transaction data or data package. Further, the decoder at the control and conflict logic can find if the data corresponds to a non-snoop transaction and whether the destination node link is free or busy with other transactions. At block 466, a routine table is checked and a route to destination is selected or decided. At block 468, the request is forwarded on to a scheduler, and the building of a new data package is requested, if necessary, and sent to the egress buffer. At block 470, egress buffer resource is allocated by the scheduler and new format of the data package is built at the control and conflict logic. At block 472, the new or newly-formatted data package is transferred to the egress buffer, while the data transaction is sent out based on protocol requirements at block 474.

Figure 5:
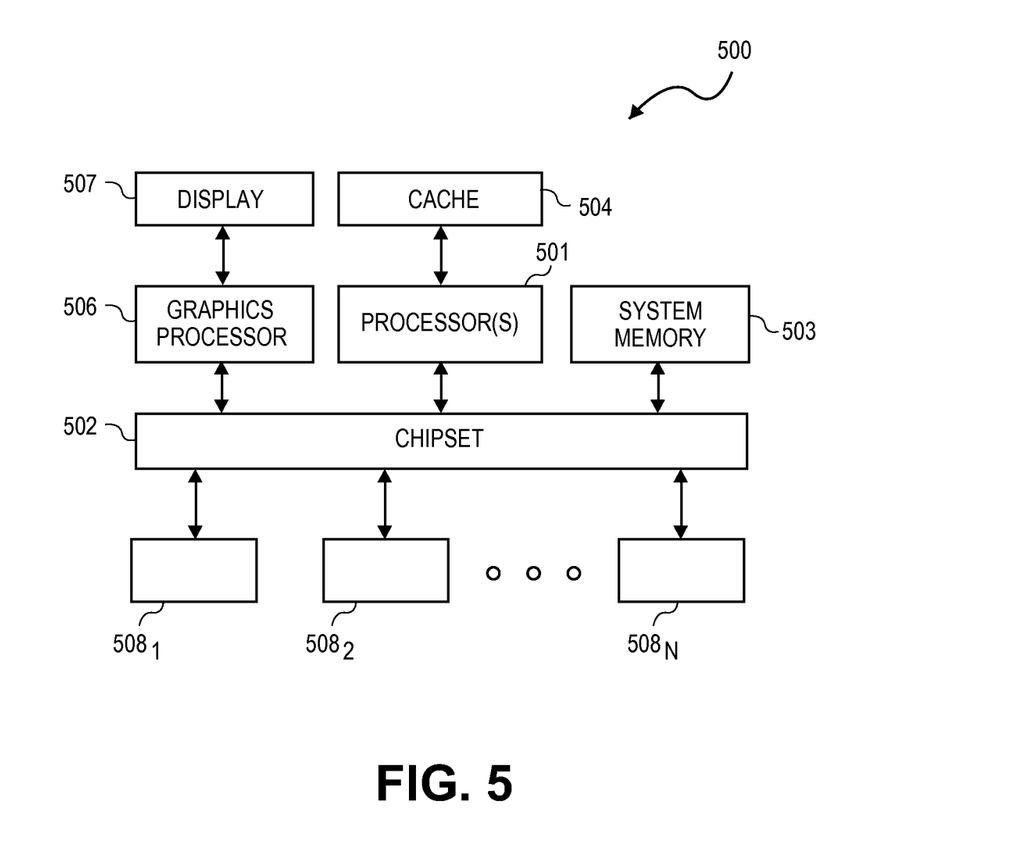
FIG. 5 illustrates a computing system according to one embodiment of the invention.

FIG. 5 illustrates a computing system employing customization mechanism of FIG. 1 according to one embodiment of the invention. The exemplary computing system 500 may be the same as or similar to computing device 100 of FIG. 1 and include: 1) one or more processors 501 one of which may include one or more features described above; 2) a chipset 502 (including, e.g., memory control hub (MCH), I/O control hub (ICH), platform controller hub (PCH), System-on-a-Chip (SoC), etc.); 3) a system memory 503 (of which different types exist such as double data rate RAM (DDR RAM), extended data output RAM (EDO RAM), non-volatile memory, etc.); 4) a cache 504; 5) a graphics processor 506; 6) a display/screen 507 (of which different types exist such as Cathode Ray Tube (CRT), Thin Film Transistor (TFT), Light Emitting Diode (LED), Molecular Organic LED (MOLED), Liquid Crystal Display (LCD), Digital Light Projector (DLP), etc.; and 7) one or more I/O devices 508.

The one or more processors 501 execute instructions in order to perform whatever software routines the computing system implements. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster static RAM (SRAM) cells whilst system memory 503 might be constructed with slower dynamic RAM (DRAM) cells. By tending to store more frequently used instructions and data in the cache 504 as opposed to the system memory 503, the overall performance efficiency of the computing system improves.

System memory 503 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 503 prior to their being operated upon by one or more of the processor(s) 501 in the implementation of a software program. Similarly, data that a software program determines should be sent from the computing system to an outside entity through one of the computing system interfaces, or stored into an internal storage element, is often temporarily queued in system memory 503 prior to its being transmitted or stored.

The chipset 502 (e.g., ICH) may be responsible for ensuring that such data is properly passed between the system memory 503 and its appropriate corresponding computing system interface (and internal storage device if the computing system is so designed). The chipset 502 (e.g., MCH) is responsible for managing the various contending requests for system memory 503 accesses amongst the processor(s) 501, interfaces and internal storage elements that may proximately arise in time with respect to one another.

One or more I/O devices 508 are also implemented in a typical computing system. I/O devices generally are responsible for transferring data to and/or from the computing system (e.g., a networking adapter); or, for large scale non-volatile storage within the computing system (e.g., hard disk drive). The ICH of the chipset 503 has bi-directional point-to-point links between itself and the observed I/O devices 508.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions, such as solid state storage devices, fast and reliable DRAM sub-systems, etc.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. A method comprising:
enhancing a multipurpose interconnect agent by associating a customization block to the multipurpose interconnect agent at a computing system, wherein enhancing comprises customization of one or more functionalities of the multipurpose interconnect agent;
customizing, via the customization block, the one or more functionalities of the enhanced multipurpose interconnect agent, wherein customizing comprises enabling integration of two or more processor interconnects carrying data packets; and
accelerating transmission of one or more data packets of the data packets through a fast path, wherein the one or more data packets are selected for the accelerated transmission based on one or more factors including identification, security classification, format, or routing table relating to the one or more data packets, wherein upon selection, the one or more data packets are fast forwarded to an egress buffer for delivery to one or more assigned destinations.

2. The method of claim 1, wherein the customization block comprises an intellectual protocol (IP) block or cluster, wherein integration comprises establishing bi-directional communication between the two or more processor interconnects for communication of the data packets.

3. The method of claim 1, wherein the two or more processor interconnects comprise one or more of a QuickPath Interconnect (QPI), Peripheral Component Interconnect (PCI), PCI Extended (PCI-X), and PCI Express (PCIe).

4. The method of claim 1, wherein customizing further comprises establishing compatibility between new components offered by the customization block and default components of the multipurpose interconnect agent, wherein establishing compatibility comprises facilitating interconnect manageability and controllability at the multipurpose interconnect agent.

5. The method of claim 1, wherein associating comprises employing the customization block into the multipurpose interconnect agent.

6. The method of claim 1, wherein the computing device comprises one or more of smartphones, personal digital assistants (PDAs), handheld computers, e-readers, tablet computers, notebooks, netbooks, servers, set-top boxes, and desktop computers.

7. The method of claim 1, further comprising:
interfacing with a snoop directory structure of the multipurpose interconnect agent for managing a snoop directory and receiving notifications of remote sockets relating to status of cache lines in the computing device and other computing devices; and
checking memory addresses to select a memory channel to serve as a recipient of a pending transaction, wherein the pending transaction includes one or more of reads/writes, partial reads/writes, different priority reads/writes, non-snoop reads/writes, and memory channel load balance functions, wherein the pending transaction to facilitate a high-level transaction control and data follow to and from a memory controller.

8. A system comprising:
a customization mechanism employed at a computing device, wherein the customization mechanism to:
enhance a multipurpose interconnect agent by associating a customization block to the multipurpose interconnect agent at a computing system, wherein enhancing comprises customization of one or more functionalities of the multipurpose interconnect agent;

customize, via the customization block, the one or more functionalities of the enhanced multipurpose interconnect agent, wherein customizing comprises enabling integration of two or more processor interconnects carrying data packets; and accelerate transmission of one or more data packets of the data packets through a fast path, wherein the one or more data packets are selected for the accelerated transmission based on one or more factors including identification, security classification, format, or routing table relating to the one or more data packets, wherein upon selection, the one or more data packets are fast forwarded to an egress buffer for delivery to one or more assigned destinations.

9. The system of claim 8, wherein the customization block comprises an intellectual protocol (IP) block or cluster, wherein integration comprises establishing bi-directional communication between the two or more processor interconnects for communication of the data packets.

10. The system of claim 8, wherein the two or more processor interconnects comprise one or more of a QuickPath Interconnect (QPI), Peripheral Component Interconnect (PCI), PCI Extended (PCI-X), and PCI Express (PCIe).

11. The system of claim 8, wherein customizing further comprises establishing compatibility between new components offered by the customization block and default components of the multipurpose interconnect agent, wherein establishing compatibility comprises facilitating interconnect manageability and controllability at the multipurpose interconnect agent.

12. The system of claim 8, wherein associating comprises employing the customization block into the multipurpose interconnect agent.

13. The system of claim 8, wherein the computing device comprises one or more of smartphones, personal digital assistants (PDAs), handheld computers, e-readers, tablet computers, notebooks, netbooks, servers, set-top boxes, and desktop computers.

14. The system of claim 8, wherein the customization mechanism is further to:
  interface with a snoop directory structure of the multipurpose interconnect agent for managing a snoop directory and receiving notifications of remote sockets relating to status of cache lines in the computing device and other computing devices; and
  check memory addresses to select a memory channel to serve as a recipient of a pending transaction, wherein the pending transaction includes one or more of reads/writes, partial reads/writes, different priority reads/writes, non-snoop reads/writes, and memory channel load balance functions, wherein the pending transaction to facilitate a high-level transaction control and data follow to and from a memory controller.

15. A non-transitory machine-readable medium having instructions stored thereon which, when executed by a computer, cause the computer to:
  enhance a multipurpose interconnect agent by associating a customization block to the multipurpose interconnect agent at a computing system, wherein enhancing comprises customization of one or more functionalities of the multipurpose interconnect agent;
  customize, via the customization block, the one or more functionalities of the enhanced multipurpose interconnect agent, wherein customizing comprises enabling integration of two or more processor interconnects carrying data packets; and
  accelerate transmission of one or more data packets of the data packets through a fast path, wherein the one or more data packets are selected for the accelerated transmission based on one or more factors including identification, security classification, format, or routing table relating to the one or more data packets, wherein upon selection, the one or more data packets are fast forwarded to an egress buffer for delivery to one or more assigned destinations.

16. The non-transitory machine-readable medium of claim 15, wherein the customization block comprises an intellectual protocol (IP) block or cluster, wherein integration comprises establishing bi-directional communication between the two or more processor interconnects for communication of the data packets.

17. The non-transitory machine-readable medium of claim 15, wherein the two or more processor interconnects comprise one or more of a QuickPath Interconnect (QPI), Peripheral Component Interconnect (PCI), PCI Extended (PCI-X), and PCI Express (PCIe).

18. non-transitory machine-readable medium of claim 15, wherein customizing further comprises establishing compatibility between new components offered by the customization block and default components of the multipurpose interconnect agent, wherein establishing compatibility comprises facilitating interconnect manageability and controllability at the multipurpose interconnect agent.

19. The non-transitory machine-readable medium of claim 15, wherein associating comprises employing the customization block into the multipurpose interconnect agent.

20. The non-transitory machine-readable medium of claim 15, wherein the computer is further to:
  interface with a snoop directory structure of the multipurpose interconnect agent for managing a snoop directory and receiving notifications of remote sockets relating to status of cache lines in the computing device and other computing devices; and
  check memory addresses to select a memory channel to serve as a recipient of a pending transaction, wherein the pending transaction includes one or more of reads/writes, partial reads/writes, different priority reads/writes, non-snoop reads/writes, and memory channel load balance functions, wherein the pending transaction to facilitate a high-level transaction control and data follow to and from a memory controller.

* * * * *